US008850386B2

(12) United States Patent
Trautmann (10) Patent No.: US 8,850,386 B2
(45) Date of Patent: Sep. 30, 2014

(54) METHOD FOR ESTIMATING RESOURCE CONSUMPTION IN THE GENERATION OF A CONTROL DEVICE PROGRAM CODE (75) Inventor: Wolfgang Trautmann, Paderborn (DE)

(73) Assignee: dSPACE digital signal processing and control engineering GmbH, Paderborn (DE)

(*) Notice: Subject to any disclaimer, the term of this patent is extended or adjusted under 35 U.S.C. 154(b) by 97 days.

(21) Appl. No.: 13/555,841

(22) Filed: Jul. 23, 2012

(65) Prior Publication Data
US 2013/0125087 A1 May 16, 2013

(30) Foreign Application Priority Data

Nov. 11, 2011 (DE) .......................... 10 2011 118 192
Mar. 21, 2012 (DE) .......................... 10 2012 102 373

(51) Int. Cl.
G06F 9/44 (2006.01)
(52) U.S. Cl.
USPC .............................. 717/104; 717/106; 717/141
(58) Field of Classification Search
USPC .................. 717/104–106, 140–141, 150–151
IPC ...................... G06F 8/33,8/35, 8/40, 8/52, 8/443
See application file for complete search history.

(56) References Cited

U.S. PATENT DOCUMENTS

| 5,991,538 | A | * | 11/1999 | Becker | 717/140 |
| 6,212,672 | B1 | * | 4/2001 | Keller et al. | 717/104 |
| 6,266,805 | B1 | * | 7/2001 | Nwana et al. | 717/104 |
| 6,996,799 | B1 | * | 2/2006 | Cismas et al. | 717/106 |
| 7,096,454 | B2 | * | 8/2006 | Damm et al. | 717/105 |
| 7,337,436 | B2 | * | 2/2008 | Chu et al. | 717/140 |
| 7,350,172 | B1 | | 3/2008 | Koh et al. | |
| 7,464,373 | B1 | * | 12/2008 | Yunt et al. | 717/125 |
| 7,475,392 | B2 | * | 1/2009 | Eichenberger et al. | 717/150 |
| 7,506,329 | B1 | * | 3/2009 | Boucher | 717/151 |
| 7,865,350 | B1 | * | 1/2011 | Tocci et al. | 703/22 |
| 7,945,894 | B2 | | 5/2011 | Peck et al. | |
| 7,979,243 | B1 | * | 7/2011 | Mosterman et al. | 703/2 |
| 8,015,543 | B1 | * | 9/2011 | Carrick et al. | 717/106 |
| 8,131,523 | B1 | * | 3/2012 | Yunt et al. | 703/2 |
| 8,341,609 | B2 | * | 12/2012 | Lee et al. | 717/141 |
| 8,359,586 | B1 | * | 1/2013 | Orofino et al. | 717/152 |

(Continued)

OTHER PUBLICATIONS

Nguyen et al, "Combining Model-Based and Combinatorial Testing for Effective Test Case Generation", ACM, pp. 100-110, 2012.*

(Continued)

Primary Examiner — Anil Khatri
(74) Attorney, Agent, or Firm — Orrick Herrington & Sutcliffe, LLP (57) ABSTRACT A method for estimating a resource consumption of storage space and/or of required runtime of a control device program code to be generated for a control program, whereby the functionality of the control program is given in an executable model. The model has a function with first functional magnitudes and first information associated with the first functional magnitudes and optimization parameters for optimizing a code generator. A program code representation is generated for part of the model comprising the function by the code generator taking into account first values of the optimization parameters. An estimation unit comprises a resource model with hardware parameters. An estimated value for the storage space requirement is determined for the control device program code and/or a runtime estimated value is determined for the control device program code by the estimation unit taking into account the hardware parameters and based on the program code representation.

18 Claims, 3 Drawing Sheets (56) References Cited

U.S. PATENT DOCUMENTS

| | | | |
|---|---|---|---|
| 8,386,996 B2* | 2/2013 | Prigge et al. | 717/104 |
| 8,522,196 B1* | 8/2013 | Kim et al. | 717/105 |
| 8,578,347 B1 | 11/2013 | Carrick et al. | |

OTHER PUBLICATIONS

Zschaler et al, "Towards Modular Code Generators Using Symmetric Language-Aware Aspects", ACM, pp. 1-5, 2011.*
Henthorne et al, "Code Generation on Steroids: Enhancing COTS Code Generators via Generative Aspects", IEEE, pp. 1-7, 2007.*
Kulkarni et al, "An Abstraction for Reusable MDD Components—Model-based Generation of Model-based Code Generators", ACM, pp. 181-184, 2008.*
"Integration of the Code Generation Approach in the Model-Based Development Process by Means of Tool Certification", Ingo Stürmer, Journal of Integrated Design and Process Science, Transactions of the SDPS, vol. 8 (2), pp. 1-11, 2004.
Zhao, Min et al. "Predicting the Impact of Optimizations for Embedded Systems", Department of Computer Science, University of Pittsburgh, Pittsburgh, 15260, pp. 1-10.
TargetLink, Advanced Practices Guide, Release 7.0—Nov. 2010, dSpace, 22 pages.
PAG/WWW:Overview; http://www.program-analysis.com/about.html; "Overview: What PAG/WWWW is about", © 1998-2009 Saarland University and AbsInt, Mar. 7, 2009—3 pages -.
ABSInt Angewandte Informatik GmbH, Saarbrucken, http://www.absint.com/, AbsInt: Analysis Toos for Embedded Systems, Apr. 3, 2012, 3 pages.
European Search Report for 12191528.4 dated Feb. 22, 2013 (with machine translation).
C. Ferdinand et al., "Combining a High-Level Design Tool for Safety-Critical Systems with a Tool for WCET Analysis on Executables", ERTS 2008—Jan. 29-31, Feb. 1, 2008—Toulouse, pp. 1-10.
Raimund Kirner et al., Fully Automatic Worst-Case Execution Time Analysis for Matlab/Simulink Models, Real-Time Systems, 2002, Proceedings, $14^{th}$ Euromicro Conference on 2002, pp. 1-10.
Wankang Zhao et al.: "Tuning the WCET of Embedded Applications", Real-Time and Embedded Technology and Applications Symposium, 2004, Proceedings, RTAS 2004, $10^{th}$ IEEE, May 25-29, 2004, pp. 1-10.
Lars Wehmeyer et al.: "Influence of Memory Hierarchies on Predictability for Time Constrained Embedded Software", Proceedings of the Design, Automation and Test in Europe Conference and Exhibition (Date '05) 1530-1591/05 $20.00 IEEE.
Susanna Byhlin et al.: Applying Static WCET Analysis to Automotive Communication Software, ECRTS '05 Proceedings of the $17^{th}$ Euromicro Conference on Real-Time Systems, IEEE Computer Society Washington, D.C. USA © 2005, 10 pages.

* cited by examiner

```
Sample (InPort, -, out OutPort)
(
        if (InPort1 >= 5)
        (
                g1 = 2 * InPort1;
                g2 = 2 * g1;
                s1 = g2 + p1;
                sw1 = s1;
        )
        else
        (
                sw1 = abs(InPort2);
        )
        OutPort = sw1;
        .....
)
```

```
Sample (InPort, -, out OutPort)
(
        if (InPort1 >= 5)
        (
          OutPort = 2 * 2 * InPort1 + InPort;
        )
        else
        (
                OutPort = abs (InPort2);
        )
        .....
)
```

Fig. 6b

METHOD FOR ESTIMATING RESOURCE CONSUMPTION IN THE GENERATION OF A CONTROL DEVICE PROGRAM CODE

CROSS REFERENCE TO RELATED APPLICATIONS

The present invention claims rights of priority to German Patent Application No. 10 2012 102 373.5 filed Mar. 21, 2012 and German Patent Application No. 10 2011 118 192.3, filed on Nov. 11, 2011, which are hereby incorporated by reference.

BACKGROUND OF THE INVENTION

The present invention relates to a method for estimating a resource consumption of storage space and/or of required runtime of a control device program code to be generated for a control program.

BRIEF SUMMARY OF THE INVENTION

Control programs or regulating programs—(hereinafter "control programs") are developed, for example, for control devices in the automobile industry or the aircraft industry.

Control devices with control programs are used, among other places, when controlling actuators, monitoring complex processes, detecting and processing a plurality of values of environmental data and/or of user inputs.

Control programs contain functions with which input values or input signals are processed, such as, for example, data from sensor signals and/or user inputs. Corresponding output values or output signals are then outputted from the control programs, for example, for controlling actuators in processes.

The increasing number of implemented functions increases the complexity of the control programs for control devices, for example, in automobiles.

In particular, in the expansion of control programs with new functions for a control device, the storage requirement for the control device program code to be executed is typically increased and frequently exceeds the available storage space. Even newly designed systems are frequently subjected to hard limitations of resources. Furthermore, there is a requirement for the control device program code that in particular time-critical control tasks are processed in the offered implementation time.

For this reason it may be desirable to optimize the control device program code as regards its resource consumption, e.g., of storage space or runtime by an optimal adjustment of various possible optimization parameters. Tools for optimization of an already present control device program code are offered, for example, by the Absint company (www.absint.com).

In order to develop the control programs, model-based development tools such as, e.g., Simulink of The MathWorks, ASCET of Etas or LabVIEW of National Instruments are can be used.

They can be used to specify the functionality of the control program graphically at first in the form of executable models.

The term "executable" denotes here that input values in the form of parameters or variables or the like can be given to the model and that output values in the form of parameters or variables or the like are generated by the model when it is executed.

The specification of the functionality takes place in such models at a higher level of abstraction than a specification at the level of textual software code such as, for example, C-code. This typically provides more clarity about the functionality of the control program. Also such models can be better reutilized since they have a more general character on account of the higher abstraction level and have not yet been set in a concrete manner for the implementation and/or the programming. The reusability of executable models—even by different developers—can save expensive development time.

A setting of the implementation results, for example, by stipulating how a function of the control program is integrated into the control device program code, for example, whether it is directly integrated or is to be invoked in the form of a subprogram.

Model-based development tools can result in that the function of the models can already be tested on a high abstraction level, i.e., the model can be executed in so-called "model-in-the-loop" tests and checked for errors.

On the other hand, a control device program code for the control program can be automatically generated on the basis of such a model by a code generator. This is, for example, C-code that can run on a control device processor or, for example, VHDL code for an FPGA or ASIC. During the generation of control device program code, the original model is usually transformed into one or more intermediate program code representations. The program code representations can carry out optimizations such as, e.g., combining or eliminating functional variables.

The generation of the control device program code from a model for a control program can, however, be extremely time-consuming on account of very long and complex control programs and extensive control functions.

In order to optimize a control device program code in accordance with a set target regarding its consumption of resources of, for example, storage space or runtime, it is usually necessary to multiply generate the control device program code with different adjustments of optimization parameters.

On the other hand, it is often not possible due to a lack of time to multiply execute the time-consuming process of the generation of the control device program code. This has the result that the optimization parameters for the final control device program code are not optimally adjusted.

In accordance with one aspect of the invention, the invention provides a method for estimating a consumption of resources of storage space requirement and/or required runtime of the control device program code for a control program in the generation of the control device program code.

In accordance with a further aspect of the invention, a method is provided for the estimating of a consumption of resources of its storage space requirement and/or required runtime of the control device program code for a control program in the generation of the control device program code.

The functionality of the control program may be given in an executable model created with a modeling software. The model has at least one function with a number of first functional magnitudes and first information associated with the first functional magnitudes and comprises optimization parameters for setting optimization settings for a code generator. A first program code representation is generated at least for a part of the model comprising the function by the code generator taking into account first values of the optimization parameters, whereby the first program code representation comprises a number of second functional magnitudes and information associated with the second functional magnitudes. The first program code representation is generated by transformation instructions from the executable model.

According to another aspect of the invention, an estimation unit is provided that comprises a resource model with a number of parameters describing hardware, whereby a first estimated value for the storage space requirement is determined for the control device program code and/or a first runtime estimated value is determined for the control device program code by the estimation unit taking into account the parameters describing the hardware and based on the first program code representation. The first estimated value for the storage space requirement and/or the first runtime estimated value is/are stored in a first memory area and/or displayed on a display device, in particular in the executable model.

In accordance with a further aspect of the invention, the code generator does not execute the complete process of code generation for the control device program code but rather generates only a first, provisional program code representation. Thus, an estimation value for resource consumption can be determined very rapidly. The determination of such an estimation value can provide a significant saving of time in comparison to the determination of one or several actual, absolute values for the resource consumption using a control device program code that is to be newly generated.

The estimation unit is may be constructed as a partial program of the code generator.

In accordance with one aspect of the invention, at least one condition concerning the resource consumption is given. The estimation unit estimates, using the given condition and as a function of the first estimated value of the storage space requirement and/or as a function of the first runtime estimated value, whether the control device program code to be generated meets the given condition and indicates in accordance with the result of the estimation that the control device program code to be generated meets the given condition or indicates that the control device program code to be generated does not meet the given condition.

The first estimated value for the storage space requirement may be determined by the estimation unit from the value for the required storage space for the second functional magnitudes of the first program code representation. In general, an estimated value of the storage space requirement may be determined from the value for the required storage space for the functional magnitudes of the corresponding program code representation, e.g., by determining a number of functional magnitudes. How much storage space is required for a functional magnitude is usually known. In this manner a simple first estimation is obtained.

An estimation for the storage space requirement in a RAM memory or in a ROM memory or in a stack may be given by an estimated value for storage space requirement.

In accordance with another aspect of the invention, a second program code representation is generated taking into account second information associated with the first functional magnitudes and/or taking into account second values for the optimization parameters. The second program code representation may be generated by the same transformation instructions from the executable model as the first program code representation. Based on the second program code representation and/or taking into account second values of the parameters describing hardware, a second estimated value for the storage space requirement and/or a second runtime estimated value may be determined for the control device program code. The second estimated value for the storage space requirement and/or the second runtime estimated value may be stored in a second memory area and/or displayed on a display device, in particular in the executable model.

Thus, several estimated values (estimated values for storage space requirement and/or runtime) may be determined in a short time as a function of the adjusted optimization parameters, of the parameters describing hardware and/or of the information associated with the first functional magnitudes and made available. A decision may be made using the estimated values about in what manner the control device program code for the control program is to be implemented.

In accordance with another aspect of the invention, a decision may be made by the estimation unit as a function of the first estimated value for storage space requirement and/or of the second estimated value for storage space requirement and/or as a function of the first runtime estimated value and/or of the second runtime estimated value and using the given condition regarding the resource consumption that the control device program code is generated by the code generator either taking into account the first information associated with the first functional magnitudes or taking into account the second information associated with the first functional magnitudes and/or taking into account the first values of the optimization parameters or taking into account the second values of the optimization parameters. For the decision about which information and/or optimization parameters are to be taken into account for the generation of code a comparison of the first estimated value for the storage space requirement with the second estimated value for the storage space requirement and/or a comparison of the first runtime estimated value with the second runtime estimated value may be made by the estimation unit taking into account the given condition in order to determine the optimal implementation. The comparison of the estimated values regarding different program code representations supports the optimization of the control device program code to be generated. The taking account of the given condition takes place, for example, by another comparison with a given threshold value.

In accordance with another aspect of the invention, the condition concerning the resource consumption may be given by a value of a parameter describing hardware and/or by a value of an optimization parameter, whereby it is determined by the parameter describing hardware and/or by the optimization parameter that the control device program code must not exceed an upper limit for the storage space requirement of the control device program code or an upper limit for the runtime of the control device program code, and/or that the control device program code is to be optimized regarding the storage space requirement or regarding the runtime. An upper limit for the storage space requirement as well as an upper limit for the runtime may be given.

In accordance with another aspect of the invention, the parameters describing hardware are deposited in the executable model or associated with the executable model or with the part of the executable model comprising the function, whereby the parameters in the executable model are accessed from the estimation unit.

As a result of the fact that the model comprises the optimization parameters and/or the parameters describing hardware, useful information for an optimized code generation regarding certain target conditions is deposited at a high abstraction level. Thus, when the model is reused, this information can be forwarded, which for its part signifies a saving of time for the development process of a control device.

In an exemplary embodiment, the function is associated with a function optimization parameter. During the generation of the control device program code, depending on the value of the function optimization parameter, program instructions for the function may be directly integrated into the control device program code or alternatively integrated into the control device program code by a subprogram-call.

In accordance with an aspect of the invention, for control tasks or control functions which have to be carried out very rapidly the program lines associated with a function are integrated directly at the position in the control program where the function is needed, because as a result, not only time-consuming function calls can be saved but there are often even other optimization possibilities, e.g., for saving intermediate variables. On the other hand, during multiple usage of the function at different positions of the control program the entire length of the control program and therefore the storage consumption for the program to be carried out are distinctly elevated. In order to keep the requirement for storage space as low as possible, it is desirable to integrate the program lines of the frequently invoked functions as subprograms and to process the subprograms by jump and return. However, this can increase the execution time of the control program for the function, among other things by copy procedures for the transmission of variables of the function.

In another embodiment of the invention, a third estimated value for storage space requirement and/or a third runtime estimated value is determined as a function of a third program code representation, whereby the third program code representation is generated by transformation from the first program code representation and/or from the second program code representation. The third program code representation has as a rule a lower abstraction level and is already closer to the concrete design of the control device program code than the first and/or the second program code representation. Thus, a more realistic estimated value can be determined on the basis of the third program code representation.

In another embodiment, a decision is made by the code generator whether the estimated value is determined on the basis of the first, the second or third program code representation.

A suggestion for changing the executable model of the control program can be determined by the estimation unit as a function of the given condition regarding the resource consumption and based on the number of the second functional magnitudes and/or based on the information associated with the second functional magnitudes. For example, the suggestion contains a change of the values of the optimization parameters, in particular a change of the function optimization parameter.

This suggestion can be displayed to the user.

The value of a parameter describing hardware may be given by the value of a register width of a processor or the number of the data registers of the processor or by a weighting factor for the number of the required processor cycles for carrying out a calculating operation by the processor. In this manner the resources of the calculating unit on which the final control device program to be generated is to be carried out can be characterized. These resource characteristic values can be taken into account in the estimation of estimating values by the estimation unit.

In accordance with one aspect of the invention, information associated with the functional magnitudes comprises information about the type of the functional magnitudes such as, for example, the value types "integer", "float" or the like, and/or the information associated with the functional magnitudes comprises information that determines that the value of a functional magnitude is read out or not read out during the runtime of the first program code.

In one embodiment, the first runtime estimated value is determined by the estimation unit by estimating the number of required processor cycles by the weighting factor.

The first provisional program code may be formed as a control flow graph and/or as a data flow graph and/or is a tree structure.

BRIEF DESCRIPTION OF THE DRAWINGS

Various aspects of the invention are illustratively described below in conjunction with the schematic drawings, whereby features with the same function are provided with the same reference numerals, and in which

FIG. 5b shows control device program code corresponding to the program code representation in FIG. 5a;

FIG. 6b shows control device program code corresponding to the program code representation in FIG. 6a.

DETAILED DESCRIPTION

Figure 1:
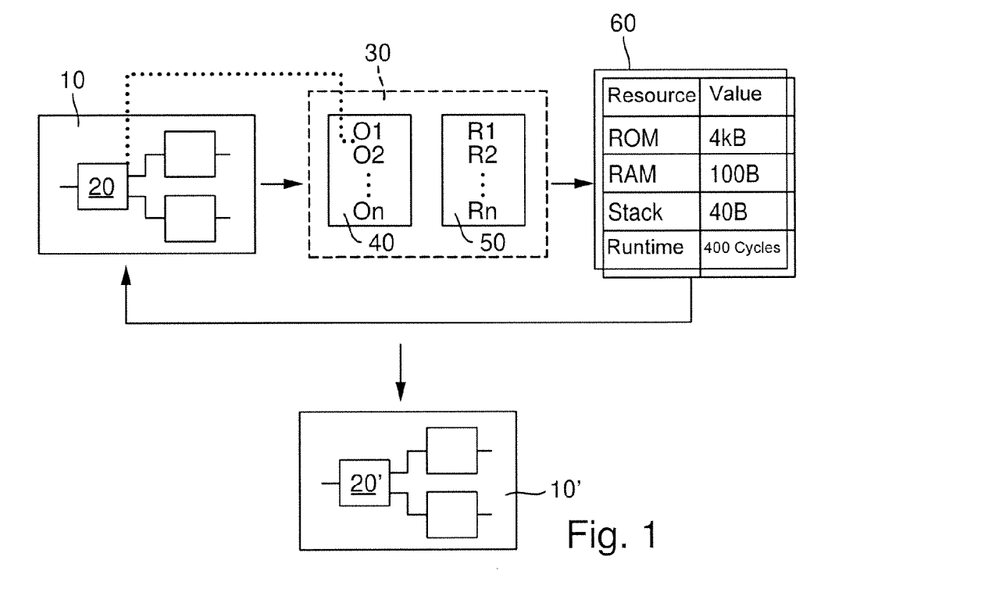
FIG. 1 shows a schematic view of an embodiment of the method in accordance with the invention.

FIG. 1 is a schematic view of one embodiment of the invention. The computer system on which the subject method runs is not explicitly shown. In accordance with one aspect of the invention, an executable model 10 may be created with modeling software and with a function 20. An estimation unit 30 and a display device 60 are present on the computer system. The model 10 is shown as a block diagram. Optimization parameters $O1, O2, \ldots, On$ are held in the model 10 or associated with the model 10 or with parts of the model 10. A dotted line indicates in FIG. 1 that the optimization parameter $O1$ is associated with the function 20. The optimization parameters $O1, O2, \ldots, On$ determine optimization settings for a code generator. The estimation unit 30 has access to or comprises a resource model 50. The resource model 50 describes the hardware resources of the calculating system—also called target or target platform—on which the control device program code to be generated for a control program is to be executed by parameters $R1, R2, \ldots Rn$ describing hardware. The arrow between the model 10 and the estimation unit 30 indicates that a first program code representation 40 (only roughly indicated in FIG. 1) is generated taking into account the optimization parameters $O1, O2, \ldots, On$ for at least a part of the model 10 by a code generator. Based on the resource model 50 and on the first program code representation 40, various estimation values for storage space requirement and a runtime estimation value are determined by the estimation unit 30 in this example and displayed on a display device 60. The displayed estimated values are stored in a first storage area and deposited in the executable model 10. Thus, an executable model 10' enriched with such information is obtained by the method in accordance with the invention. For example, the model 10' comprises—e.g., upon the suggestion of the estimation unit—changed optimization parameters $O'1, O'2, \ldots O'm$.

Figure 2:
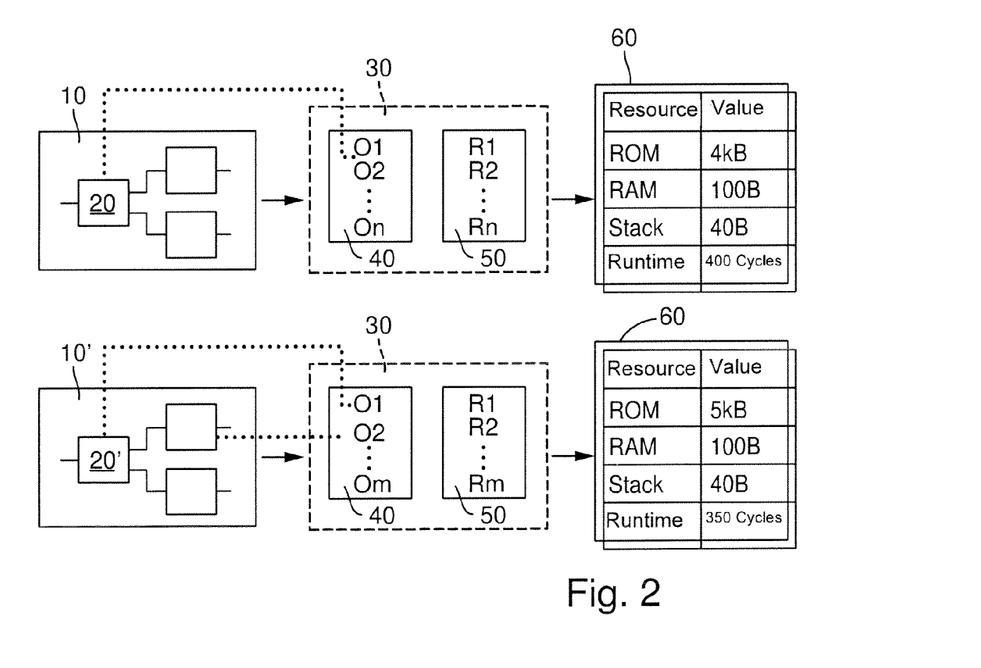
FIG. 2 shows a schematic view of another embodiment of a method in accordance with the invention.

FIG. 2 shows another embodiment of the invention in which the method described in accordance with FIG. 1 is carried out twice; once with the optimization parameters $O1, O2, \ldots, On$ and in a second execution with the model 10' and the optimization parameters O'1, O'2, ... O'm and, if necessary, also with changed resource parameters R'1, R'2, ... R'n. The estimated values obtained in the two executions can be compared.

Figure 3:
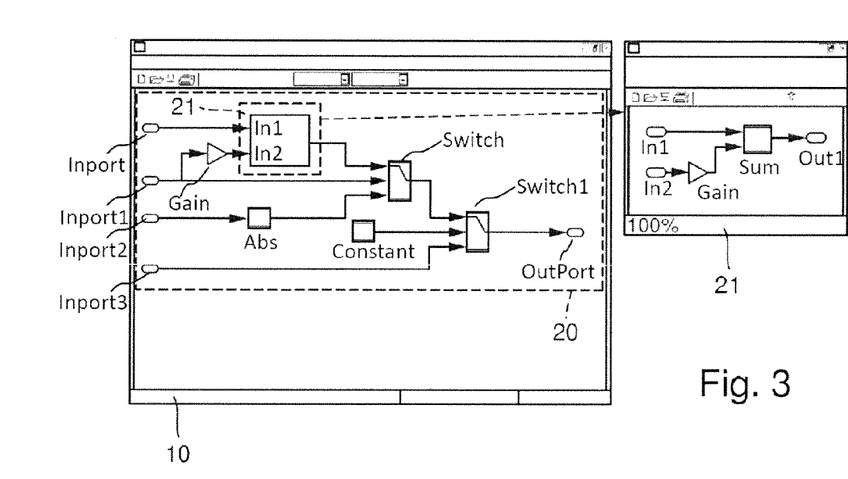
FIG. 3 shows an exemplary modeling of functions in an executable model.

FIG. 3 shows an example of an executable model 10 created with a modeling software which comprises a function 20 with function blocks and connection lines. The function blocks (also designated in the following only as blocks) stand, e.g., for operations that are carried out on signals, i.e., functional magnitudes. The connection lines define the data flow of the signals from left to right. The function 20 has four signal inputs, InPort, InPort1, InPort2 and InPort 3. In addition, the function 20 has a subfunction 21. The subfunction 21 is modeled in the model 10 by a subsystem block with signal inputs In1 and In2 as well as signal output Out1. The signal input InPort is connected to the input In1 of the subsystem block. Signal input InPort1 is connected to signal input In2 via a so-called amplifier block "gain" with the amplification factor 2. In the block "gain" the incoming signal is multiplied by the amplification factor. The value of signal input InPort is therefore multiplied by the factor 2 on signal input In2 upon execution of the model. Furthermore, InPort1 is connected to the middle input of a switch block "switch". The switch block "switch" is adjusted (not visible in FIG. 3) in such a manner that if the value of InPort1 is greater or equal to 5, the upper input of the block "switch" is activated, and if the value of InPort1 is less than 5 the lower input of the block "switch is activated. The lower input of the block "switch" receives as input signal the signal exiting from the block "Abs", namely, the amount of the value from the signal input "InPort2". Function 20 has another switch block "switch1". The switch block "switch1" is adjusted (not visible in FIG. 3) in such a manner that if the value of the signal on the middle input is greater than zero, the upper input of the block "swtich1" is active, otherwise the lower input of the block "switch1". Since there is a constant block with the constant value 1 on the middle input, in this instance the upper input is always active.

The content of the subsystem, i.e., here the subfunction 21, is deposited in the subsystem block. The content is shown on the right in FIG. 3 and comprises several function blocks that as a whole model the functionality of the subfunction 21. Subfunction 21 calculates an output signal Out1 from the two input signal In1 and In2. In2 is multiplied by a factor of 2. The multiplication is again represented by a block "gain". The resulting value of the multiplication and is added to In1, from which the value of Out1 results.

Figure 4:
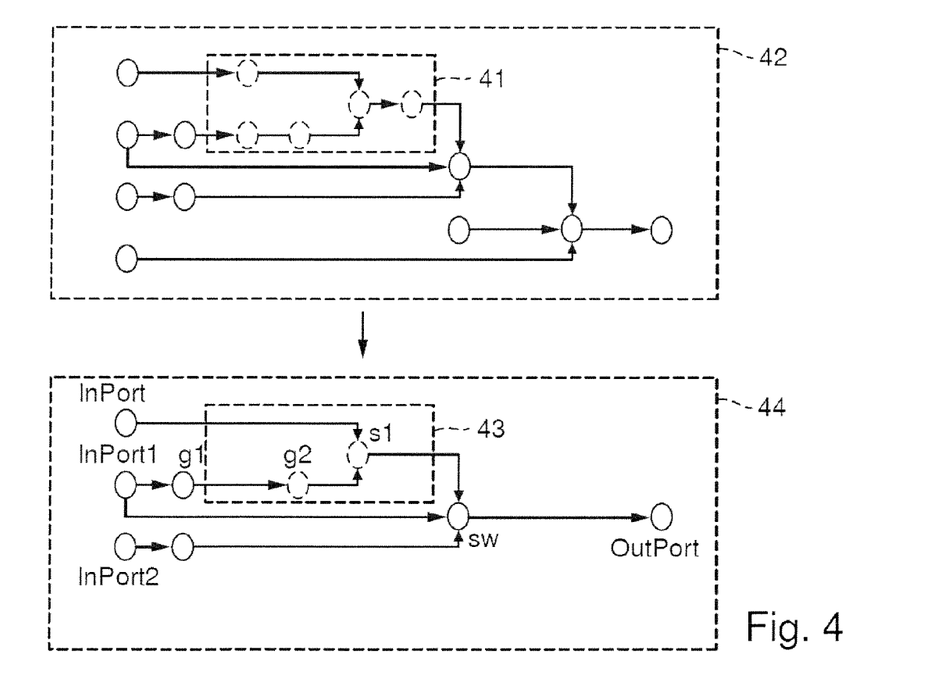
FIG. 4 shows an exemplary program code representation for functions in a model.

The upper part of FIG. 4 shows a possible program code representation in the form of a mixed data-and control flow graph 42. The graph 42 is a schematic representation of the function 20 as it is created during the course of the code generation by a code generator. The functional blocks and connection lines are represented at first as nodes and edges and further connoted information, e.g., optimization information in the form of deposited optimization parameters, is not illustrated in FIG. 4. The subfunction 21 is also represented in the upper part of FIG. 4 as partial graph 41. The nodes in the graphs 42 and 41 symbolize operations and the connection lines (edges) show the data flow. At first, magnitudes are provided for all nodes as output magnitudes of an operation by the code generator. For the graph 42 indicated in FIG. 4, 15 functional magnitudes would be established without further transformations by a code generator since nodes are represented even for the inputs of the subsystem block from the model 10. However, in order to not generate superfluous code, transformations on the basis of the existing information may be carried out for purposes of optimization. This results in a further program code representation 44 for the function 20, that contains a program code representation 43 of subfunction 21. The program code representations 43 and 44 are listed in the lower section of FIG. 4. It turns out that some nodes and therefore also functional magnitudes, i.e., variables are eliminated by the transformation. In order to represent the connection to the signals in the model 10, the names of initial magnitudes of nodes are displayed in the lower part of FIG. 4 and names for auxiliary magnitudes, g1, g2, s1 and sw are indicated that the code generator would establish in the generation of control device program code for the program code representations 42 and 44. Eliminations are made in this example in the transformation from the graph 42 to the program code representation 44 on account of the information that in the switch block "switch1" cited in FIG. 3 the lower input is always inactive and therefore superfluous. Also, the transfer magnitudes between the function 20 and the subfunction 21 are saved. Therefore, only nine instead of fifteen functional magnitudes are still provided for the program code. Using the number of the functional magnitudes of the program code representation 44, a first estimation for the storage space requirement can be carried out. The determination of a runtime estimation value takes place using the cited operations in conjunction with the information about how many process cycles are required by an operation.

Figure 5A:
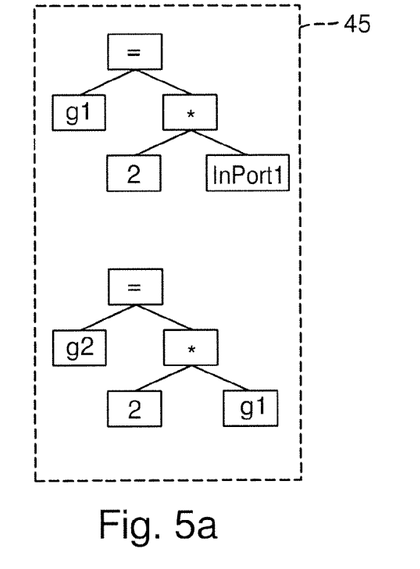
FIG. 5a shows further exemplary program code representations.

FIG. 5a shows another program code representation 45 for a part of the function 20 and a part of the subfunction 21 in the form of generally customary tree structures. The representation proceeding from several transformations for the multiplication operation as well as of the block "gain" from the function 20 of the model 10 as well as of the block "gain" from the subfunction of the model 10 are illustrated by way of example.

Figure 5B:
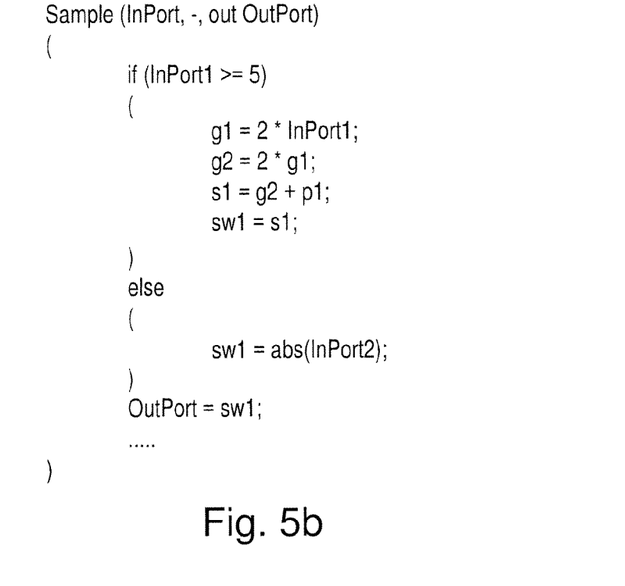

FIG. 5b shows a control device program code for the function 20, that corresponds to the abstraction level of the tree structures in FIG. 5a.

Figure 6A:
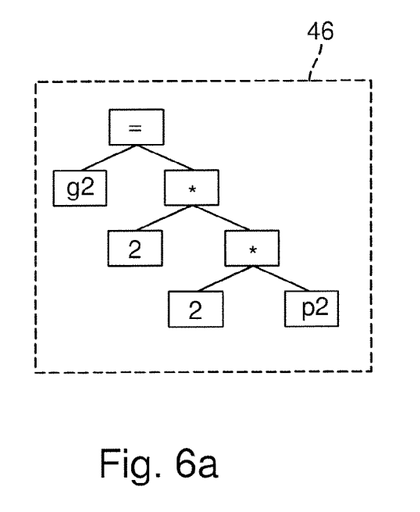
FIG. 6a shows further exemplary program code representations.
Figure 6B:
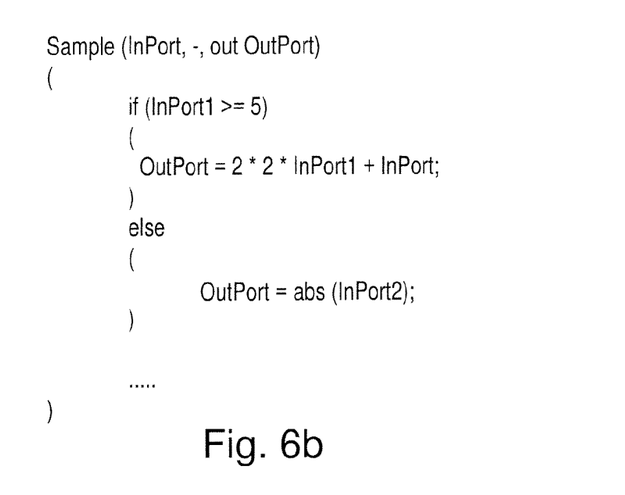

However, it is possible for the code generator to carry out even further transformations for the optimization of the control device program code on the basis of the representation of the tree structure. For example, so-called U-D chains may be formed, whereby chains of tree structures are formed in that defined functional magnitudes are replaced by their definition. Such a chain 46 is illustrated in FIG. 6a. The corresponding control device program code is illustrated in FIG. 6b. The code in FIG. 6b is shorter than the code in FIG. 5b. It is therefore apparent that a prediction about a required storage space requirement can be refined according to on the basis of which program code representation the statement is made. The user of the method can decide in a preferred embodiment whether the estimation should be carried out on a representation plane that already comes very close to the control device program code or whether an especially rapid estimation should be based on a higher program code representation.

What is claimed is:
1. A computerized method for estimating a resource consumption of storage space and/or of required runtime of a control device program code to be generated from an executable model, wherein the executable model has at least one function, and the function has one or more first functional magnitudes, information associated with the first functional magnitudes and optimization parameters providing optimization settings for a code generator the method comprising:
  generating, via the code generator, a first program code representation for a part of the executable model comprising the function while taking into account a first set of values of the optimization parameters, wherein the first program code representation comprises one or more second functional magnitudes and information associated with the second functional magnitudes and generating a second program code representation taking into account second information associated with the first functional magnitudes and/or taking into account a second set of values of the optimization parameters, and generating a third program code representation by transformation from the first program code representation and/or from the second program code representation processing via an estimation unit, having a resource model with one or more parameters-describing hardware, to determine:

(1) a first estimated value for the storage space requirement for the control device program code and/or a first estimated runtime value for the control device program code wherein the first estimated value takes into account the one or more parameters describing the hardware and are based on the first program code representation, and (2) a second estimated value for storage space requirement and/or a second estimated runtime value, wherein the second estimated values are determined based on the second program code representation and/or take into consideration second values of the one or more parameters describing hardware; and (3) a third estimated value for storage space requirement and/or a third estimated runtime value wherein the third estimated values are determined based on the third program code representation, storing the third estimated value for the storage space requirement and/or the third estimated runtime value in a memory area;

wherein the parameters describing hardware are associated with the executable model or with the part of the executable model comprising the function.

2. The method according to claim 1, wherein at least one condition concerning the resource consumption is given, and wherein the estimation unit estimates, as a function of the first and/or the second and/or the third estimated value of the storage space requirement and/or as a function of the first and/or the second and/or the third estimated runtime value, whether the control device program code to be generated meets the given condition, and wherein the estimation unit indicates in accordance with the result of the estimation that the control device program code to be generated meets the given condition or indicates that the control device program code to be generated does not meet the given condition.

3. The method according to claim 1 wherein a decision is made by the estimation unit as a function of the first estimated value for the storage space requirement and/or of the second estimated value for the storage space requirement and/or of the third estimated value for the storage space requirement and/or as a function of the first estimated runtime value and/or of the second estimated runtime value and/or of the third estimated runtime value and using a given condition regarding the resource consumption that the control device program code is generated by the code generator either taking account of the first information associated with the first functional magnitudes or taking account of the second information associated with the first functional magnitudes and/or taking account of the first values of the optimization parameters or taking account of the second values of the optimization parameters.

4. The method according to claim 3, wherein a comparison of the first estimated value for the storage space requirement with the second estimated value for the storage space requirement and/or a comparison of the first runtime estimated value with the second runtime estimated value is/are made by the estimation unit for the decision.

5. The method according to claim 3, wherein the condition concerning the resource consumption is given by a value of a parameter describing hardware and/or by a value of an optimization parameter, whereby it is determined by the parameter describing hardware and/or by the optimization parameter that the control device program code must not exceed an upper limit for the storage space requirement of the control device program code or an upper limit for the runtime of the control device program code, and/or that the control device program code is to be optimized regarding the storage space requirement or regarding the runtime.

6. The method according to claim 1, wherein the function is associated with a function optimization parameter and that depending on the value of the function optimization parameter program instructions for the function are directly integrated into the control device program code or integrated into the control device program code by a subprogram call.

7. The method according to claim 1, wherein a suggestion for changing the model of the control program is determined by the estimation unit as a function of the given condition and based on the number of the second functional magnitudes and/or based on the information associated with the second functional magnitudes and displayed to a user of the executable model.

8. The method according to claim 7, wherein the suggestion contains a change of at least one of the values of the optimization parameters.

9. The method according to claim 7, wherein the suggestion contains a change of the function optimization parameter.

10. The method according to claim 1, wherein the value of a parameter describing hardware is given by the value of a register width of a processor or the number of the data registers of the processor or by a weighting factor for the number of the required processor cycles for carrying out a calculating operation by the processor.

11. The method according to claim 10, wherein the first estimated runtime value is determined by the estimation unit by estimating the number of the required processor cycles by the weighting factor.

12. The method according to claim 1, wherein the information associated with the first functional magnitudes and/or the information associated with the second functional magnitudes comprise/s information about the type of the functional variables and/or information that determines that the value of a functional magnitude is read out or not read out during the runtime of the first program code.

13. The method according to claim 1, wherein the first estimated value for the storage space requirement is determined from the value for the required storage space for the second functional magnitudes cited in the first program code representation and/or from the value for the required storage space for the functional magnitudes cited in the second program code representation and/or from the value for the required storage space for the functional magnitudes cited in the third program code representation.

14. The method according to claim 1, wherein an estimation for the storage space requirement in a RAM memory or in a ROM memory or in a stack is given by the first estimated value for storage space requirement.

15. The method according to claim 1, wherein the first estimated value for the storage space requirement and/or the first estimated runtime value for the control device program code is stored in a first memory area in the executable model.

16. The method according to claim 1, wherein the third program code representation is generated after the first estimated value for the storage space requirement for the control device program code and/or the first estimated runtime value for the control device program code and/or the second estimated value for the storage space requirement for the control device program code and/or the second estimated runtime value for the control device program code have been determined.

17. A computerized method for estimating a resource consumption of storage space and/or of required runtime of a control device program code to be generated from an executable model, wherein the executable model has at least one function, and the function has one or more first functional magnitudes, information associated with the first functional magnitudes and optimization parameters providing optimization settings for a code generator comprising:

generating, via the code generator, a first program code representation for a part of the executable model comprising the function while taking into account a first set of values of the optimization parameters, wherein the first program code representation comprises one or more second functional magnitudes and information associated with the second functional magnitudes and processing via an estimation unit, having a resource model with one or more parameters-describing hardware, to determine:
      a first estimated runtime value for the control device program code
      wherein the first estimated value takes into account the one or more parameters describing the hardware and is based on the first program code representation, and
   storing the first estimated runtime value in a memory area
   wherein the value of a parameter describing hardware is given by a weighting factor for the number of the required processor cycles for carrying out a calculating operation by the processor;
   wherein the parameters describing hardware are associated with the executable model or with the part of the executable model comprising the function.

18. The method according to claim 17, wherein the first runtime estimated value is determined by the estimation unit by estimating the number of the required processor cycles by the weighting factor.

* * * * *